(12) United States Patent
Green et al.

(10) Patent No.: US 7,419,184 B2
(45) Date of Patent: Sep. 2, 2008

(54) AIRBAG TETHER RELEASE MECHANISM

(75) Inventors: David J. Green, Brigham City, UT (US); Michael P. Jordan, South Weber, UT (US); Brent A. Parks, Englewood, CO (US)

(73) Assignee: Autoliv ASP, Inc., Ogden, UT (US)

( * ) Notice: Subject to any disclaimer, the term of this patent is extended or adjusted under 35 U.S.C. 154(b) by 341 days.

(21) Appl. No.: 11/154,126

(22) Filed: Jun. 16, 2005

(65) Prior Publication Data

US 2006/0284404 A1  Dec. 21, 2006

(51) Int. Cl.
*B60R 21/16* (2006.01)
(52) U.S. Cl. ............... 280/743.2; 280/742; 280/736
(58) Field of Classification Search .......... 280/743.2, 280/739, 743.1, 736, 742; 222/3, 5
See application file for complete search history.

(56) References Cited

U.S. PATENT DOCUMENTS

| 4,453,292 A | 6/1984 | Bakker |
| 5,269,098 A | 12/1993 | Redman |
| 5,887,894 A | 3/1999 | Castagner et al. |
| 6,454,300 B1* | 9/2002 | Dunkle et al. ............... 280/742 |
| 6,513,835 B2* | 2/2003 | Thomas .................. 280/743.2 |
| 6,561,545 B2* | 5/2003 | Greib et al. ............. 280/743.2 |
| 6,886,338 B2* | 5/2005 | Fischer et al. ................ 60/632 |
| 7,111,871 B2* | 9/2006 | Thomas .................. 280/743.2 |
| 7,275,763 B2* | 10/2007 | Thomas et al. ........... 280/743.2 |
| 2002/0125705 A1 | 9/2002 | Wong et al. |
| 2004/0112239 A1 | 6/2004 | Parks et al. |
| 2005/0146122 A1* | 7/2005 | Gould et al. ................ 280/739 |
| 2007/0194561 A1* | 8/2007 | Thomas ................... 280/728.2 |

\* cited by examiner

*Primary Examiner*—Kevin Hurley
*Assistant Examiner*—Drew J. Brown
(74) *Attorney, Agent, or Firm*—Sally J Brown; Stoel Rives LLP

(57) ABSTRACT

Disclosed are embodiments of an airbag tether release mechanism for use with airbag inflation systems. In one embodiment, the mechanism includes an initiator positioned within a housing. The initiator is configured such that it provides an inherent seal to prevent the external release of pyrotechnic residues upon deployment. The device may also include a cutter operatively connected with the initiator such that deployment of the initiator actuates the cutter and a tether restraint structure configured to secure a tether until the tether is released by actuation of the cutter.

35 Claims, 7 Drawing Sheets

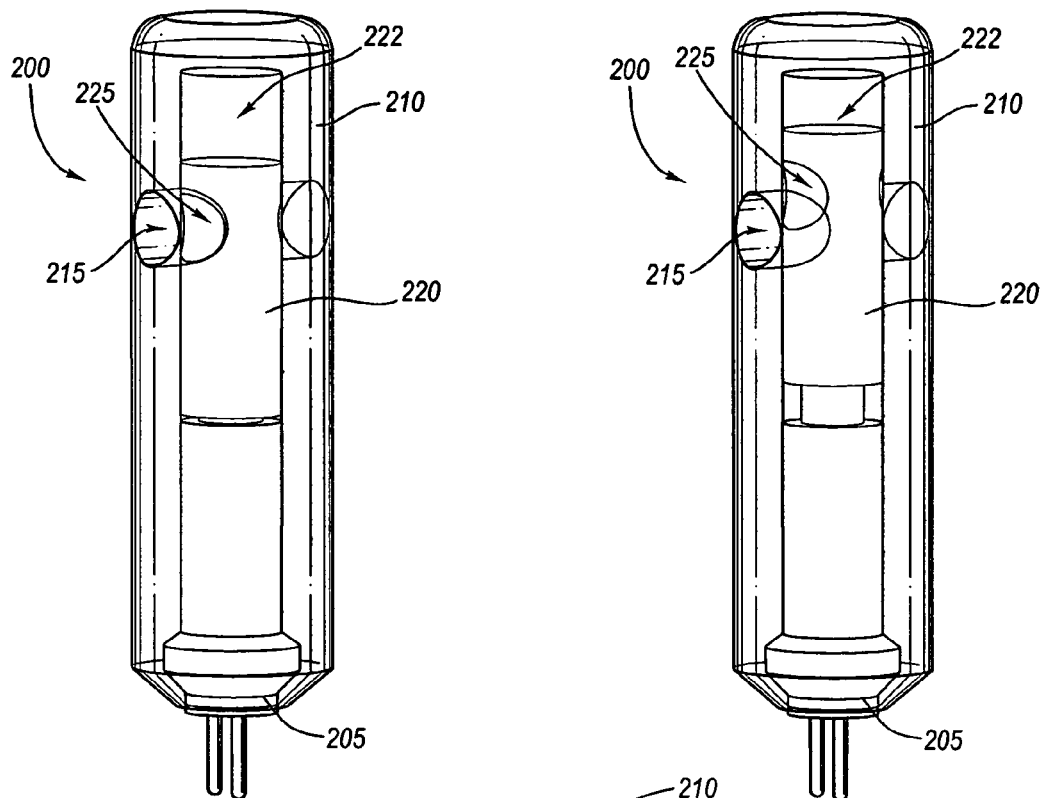
Fig. 3A
Fig. 3B
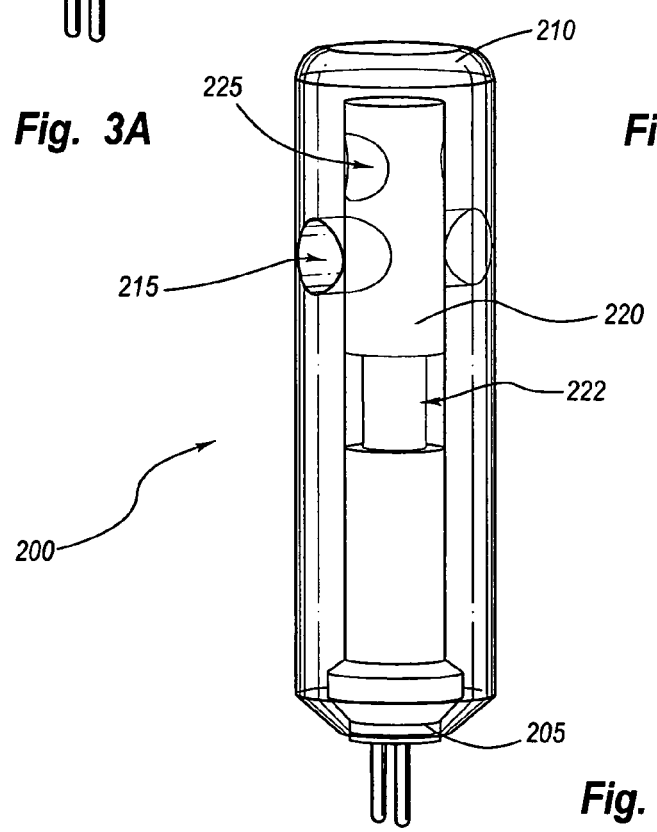
Fig. 3C

AIRBAG TETHER RELEASE MECHANISM

TECHNICAL FIELD

The present invention relates generally to the field of automotive protective systems. More specifically, the present invention relates to a release mechanism for tethers connected with airbag cushions.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 3A is a perspective view of a second embodiment of an airbag tether release mechanism.

FIG. 3B is a perspective view of the embodiment shown in FIG. 3A after the opening in the piston has been partially misaligned with the opening in the housing.

FIG. 3C is a perspective view of the embodiment shown in FIGS. 3A and 3B after the opening in the piston has been fully misaligned with the opening in the housing.

DETAILED DESCRIPTION OF PREFERRED EMBODIMENTS

Described below are embodiments of an airbag tether release mechanism for use with airbag inflation systems. In one embodiment, the mechanism includes an initiator positioned within a housing. The initiator is configured such that it provides an inherent seal to prevent the external release of pyrotechnic residues upon deployment. The device may include a cutter operatively connected with the initiator such that deployment of the initiator actuates the cutter and a tether restraint structure configured to secure a tether until the tether is released by actuation of the cutter.

Figure 1:
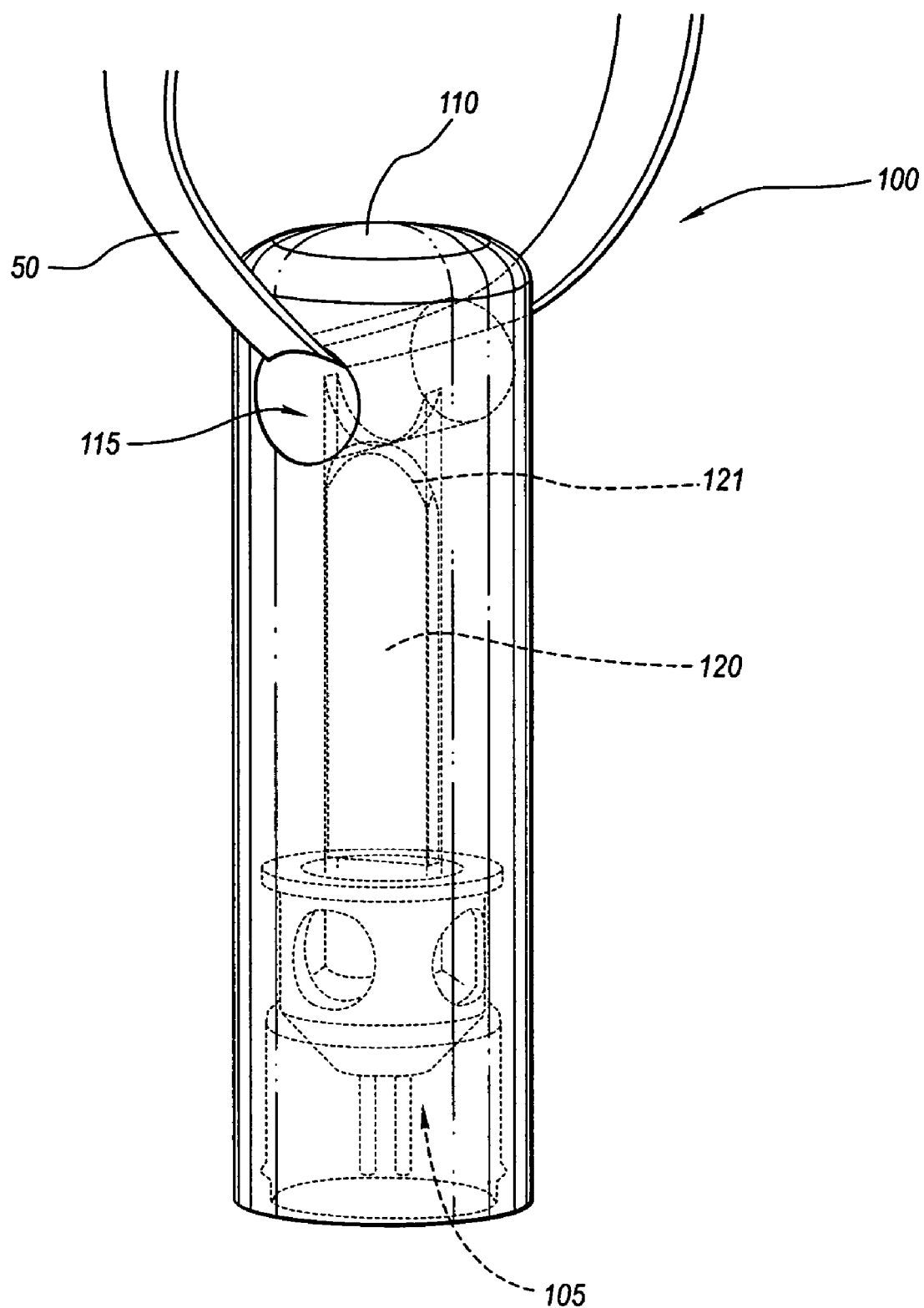
FIG. 1 is a perspective view of one embodiment of an airbag tether release mechanism.
Figure 2A:
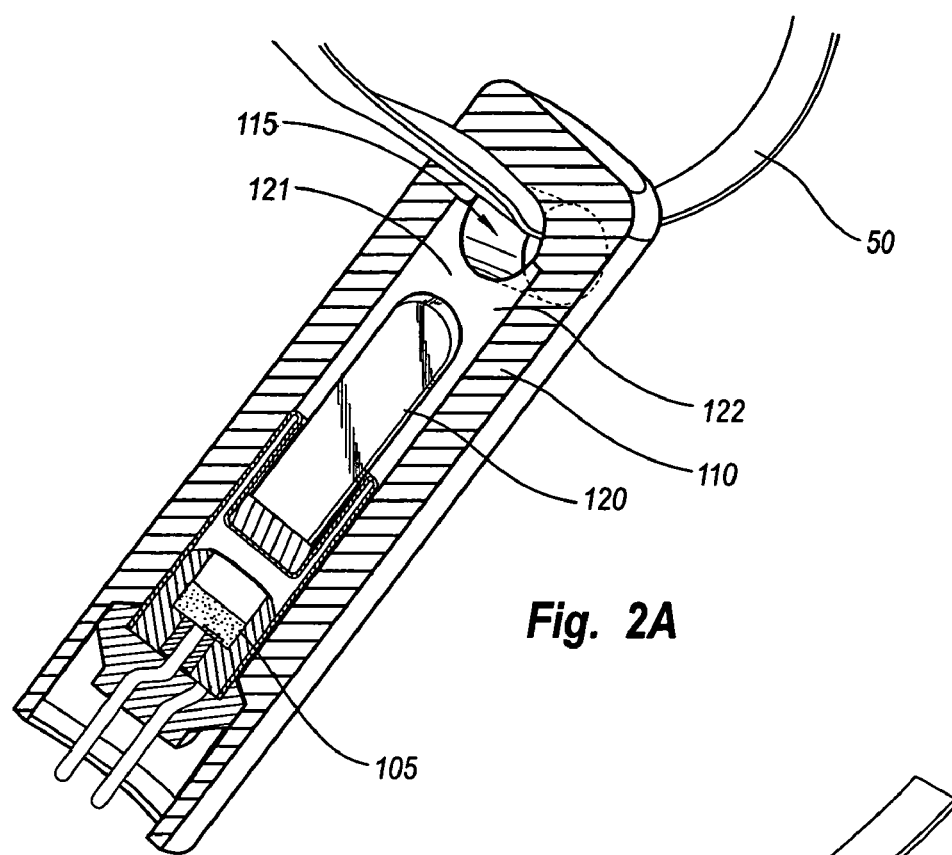
FIG. 2A is a cross-sectional view of the embodiment depicted in FIG. 1.
Figure 2B:
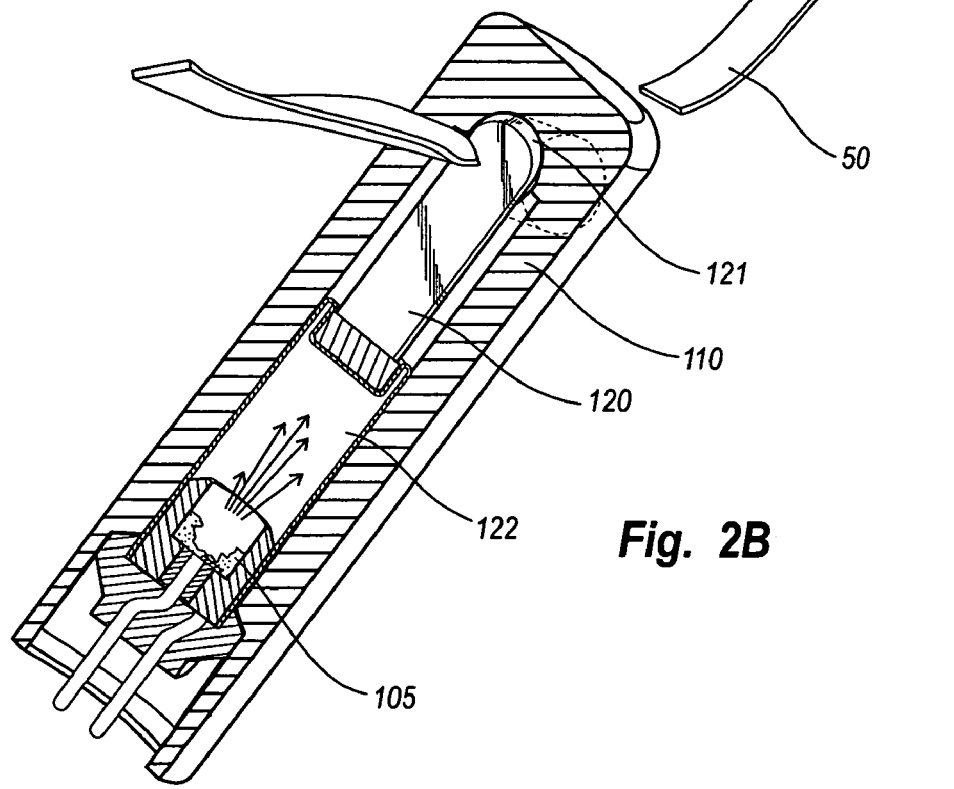
FIG. 2B is a cross-sectional view of the embodiment depicted in FIGS. 1 and 2A shown after the cutter has cut through and released the tether.

With reference to the accompanying figures, embodiments of the invention will now be described in greater detail. In FIGS. 1 and 2A-2B, a tether release mechanism 100 is shown. Tether release mechanism 100 comprises an initiator 105 positioned within a housing 110. Initiator 105 may be configured such that it is non-flashing and non-propulsive. In other words, initiator 105 does not emit a flash and has no loose parts (parts that leave the device other than a tether or similar released articles—e.g., a bolt). Initiator 105 is provided with an inherent seal to prevent the external (external to the initiator) release of pyrotechnic residues upon deployment. Thus, an o-ring need not be used in order to seal the initiator in the housing and prevent propulsion and flashing. This may also be useful because it may allow the device to be classified in a less restrictive hazard category. As one having ordinary skill in the art will appreciate, initiator 105 may be activated pyrotechnically or otherwise.

Initiator 105 obtains its aforementioned inherent seal by virtue of having an output cup with a redrawn end. In other words, the end of initiator 105 is rolled back inside itself, "unrolls", and extends during deployment, thereby providing the force necessary to actuate the cutters described herein. Such "redrawn" initiators have been disclosed and described in greater detail in copending U.S. patent application Ser. No. 10/729,702 filed Dec. 5, 2003 and titled "Assemblies including extendable, reactive charge-containing actuator devices." Other embodiments of such initiators have been disclosed and described in greater detail in copending U.S. patent application Ser. No. 10/729,702 filed on the same day as the present application and titled "Assemblies including extendable, reactive charge-containing actuator devices." The disclosures of these two applications are hereby incorporated by reference in their entireties.

Tether release mechanism 100 may be mounted on the back of an inflator module. Tether 50 in FIG. 1 extends through an opening 115 formed within the housing 110. A cutter 120 having a cutting blade 121 is operatively connected with the initiator 105. This allows deployment of initiator 105 to actuate the cutter 120, as described below.

Cutter 120 is slidable within a cutter slot 122 formed in housing 110, as best seen in FIGS. 2A-2B. Cutter 120 is configured and positioned such that it may be moved from a position adjacent to opening 115, as shown in FIG. 2A, to a position at which it is at least partially coincident with opening 115, as shown in FIG. 2B. Once initiator 105 has been deployed, cutter 120 is actuated or moved axially within housing 110 such that it extends into opening 115, thereby allowing cutting blade 121 to cut through tether 50. Opening 115 in the embodiment depicted in FIGS. 1 and 2A-2B comprises a tether restraint structure configured to secure tether 50 until it is released by actuation of cutter 120.

Cutter 120 may be positioned within cutter slot 122 such that it is only slidable after a threshold amount of force has been applied to cutter 120. For example, cutter 120 may be tightly positioned within cutter slot 122 such that a threshold amount of friction must be overcome before cutter 120 can be slid up to opening 115. In this manner, unintentional repositioning of cutter 120 can be prevented or at least minimized. It may be desirable in some embodiments to configure the device such that a level of force just under that provided by the initiator is required to move cutter 120.

A second embodiment of the invention is shown in FIGS. 3A-3C. Tether release mechanism 200 includes an initiator 205 positioned within a housing 210. Like initiator 105 in the embodiment shown in the previous figures, initiator 205 is configured such that it is non-flashing and non-propulsive. Initiator 205 therefore does not emit a flash and has no loose parts that it propels upon deployment. Initiator 205 is also provided with an inherent seal to prevent the external release of pyrotechnic residues upon deployment.

Housing 210 again has an opening 215 formed therein and extending from one side of housing 210 to the other and serving as a tether restraint structure configured to secure a tether until the tether is released by actuation of a cutter 220. Cutter 220 in this embodiment does not comprise a cutting blade. Instead, cutter 220 comprises a piston having an opening 225 formed therein. Piston 220 is positioned in a cylindrical slot 222 within housing 210 and is configured to be slidable within slot 222. Piston 220 may be frictionally engaged within the portion of housing 210 which defines slot 222 such that a threshold level of force is required to slide piston 220 within slot 222. Piston 220 is configured such that, prior to deployment of the initiator 205, the opening 215 in the housing 210 is aligned with the opening 225 in the piston 220, and wherein, following deployment of the initiator 205, the opening 225 in the piston 220 is moved out of alignment with the opening 215 in the housing 210.

A tether (not shown) may be strung through the aligned openings 215 and 225. Upon deployment of initiator 205, the force on piston 220 causes the misalignment of the two openings. The shearing force from the sliding of piston 220 within slot 222 may be used to sever the tether. Of course, many alternatives are possible. For example, the portion of piston 220 that defines opening 225 may be sharpened to further facilitate cutting the tether. A cutting blade may also be provided to cut the tether if desired. As yet another alternative, in some embodiments it may be desirable to provide an opening in the housing that is sized differently on opposing sides of the housing. This may allow for a tether to be cut on one side of the opening only (the side where the edge of the opening in the housing and the edge of the opening in the piston come into contact first). An example of such a feature can be seen in the embodiment of FIGS. 7A and 7B.

Figure 4A:
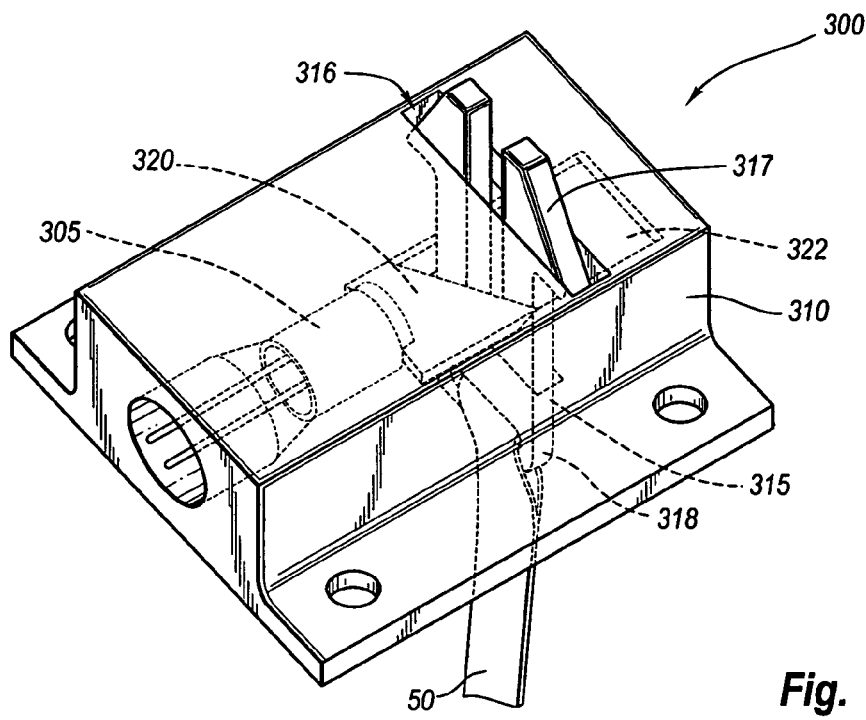
FIG. 4A is a perspective view of a third embodiment of an airbag tether release mechanism.
Figure 4B:
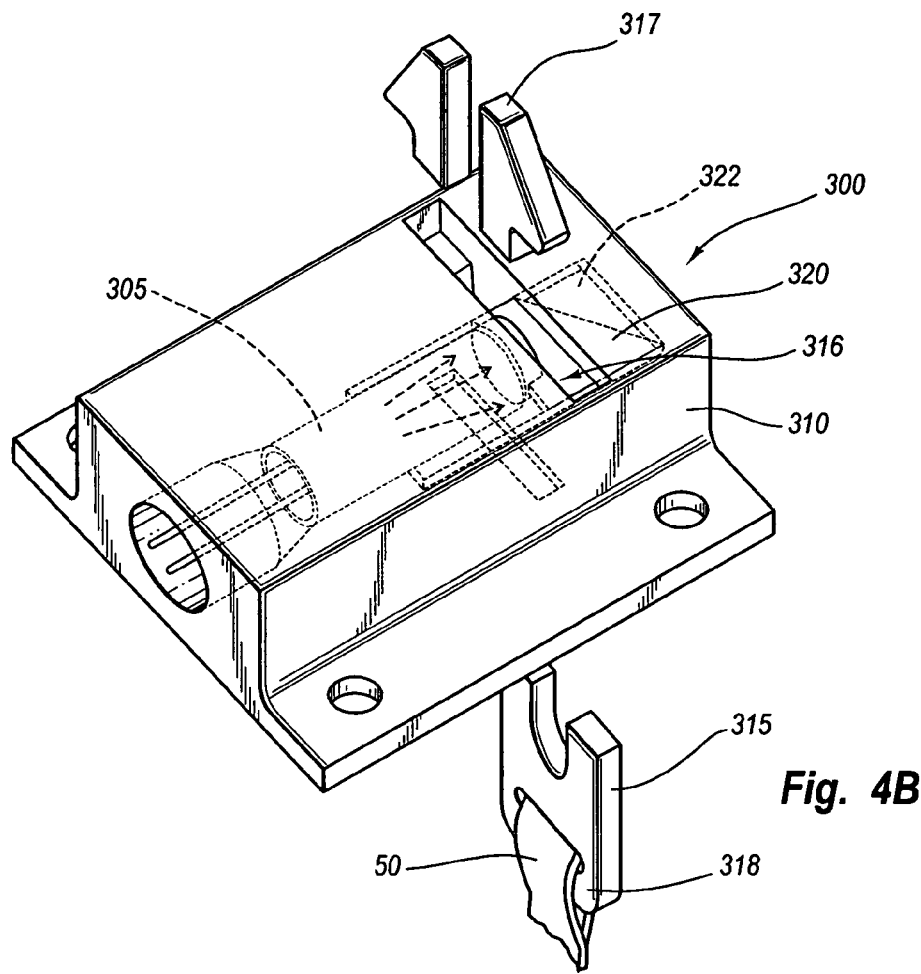
FIG. 4B is a perspective view of the embodiment shown in FIG. 4A after the cutter has cut through a clip to release the tether.

Still another embodiment of the invention is depicted in FIGS. 4A-4B. Tether release mechanism 300 again includes an initiator 305 positioned within a housing 310. Initiator 305 is non-flashing and non-propulsive such that it does not emit a flash and has no loose parts that it propels upon deployment. Initiator 305 is also provided with an inherent seal to prevent the external release of pyrotechnic residues upon deployment.

Tether release mechanism 300 includes a tether restraint structure 315. Tether restraint structure 315 in this embodiment comprises a clip. Clip 315 is configured to snap into a recess 316 formed within the housing 310. Clip 315 has two prongs 317 that may be somewhat flexible to allow them to bend and snap into place within recess 316. It should be understood, however, that embodiments are contemplated which include only a single prong. Clip 315 is also configured to secure a tether 50. In this embodiment, tether 50 is looped around an opening at end 318 of clip 315.

Clip 315 is configured to secure tether 50 until the tether 50 is released by actuation of a cutter 320. Cutter 320 is positioned adjacent to initiator 305 so that the deployment force from initiator 305 can be translated to cutter 320. Cutter 320 is slidable within slot 322, which is formed within housing 310. Upon deployment of the initiator 305, cutter 320 is configured to sever the prongs 317 of clip 315, thereby releasing tether 50, as shown in FIG. 4B.

Any of the embodiments described above can be used to restrain a tether, deploy an initiator that actuates a cutter, and release the tether by actuating the cutter. The tether may be restrained by an opening in the housing, as in the embodiments shown in FIGS. 1-3C, by a clip, as in the embodiment shown in FIGS. 4A-4B, or by any other similar structures that this disclosure would suggest to, or otherwise available to, a person having ordinary skill in the art. Each of the foregoing are examples of restraining means for restraining an airbag tether.

The tether may be released with a cutting blade, as in the embodiment shown in FIGS. 1-2B and 4A-4B, by a piston having an opening formed therein so as to provide a shearing force, or by any other similar structures that this disclosure would suggest to, or otherwise available to, a person having ordinary skill in the art. Each of the foregoing are examples of releasing means for releasing the tether from the restraining means. The tether may be released by directly cutting the tether. The tether may alternatively be released by cutting a tether restraint structure restraining the tether.

Figure 5:
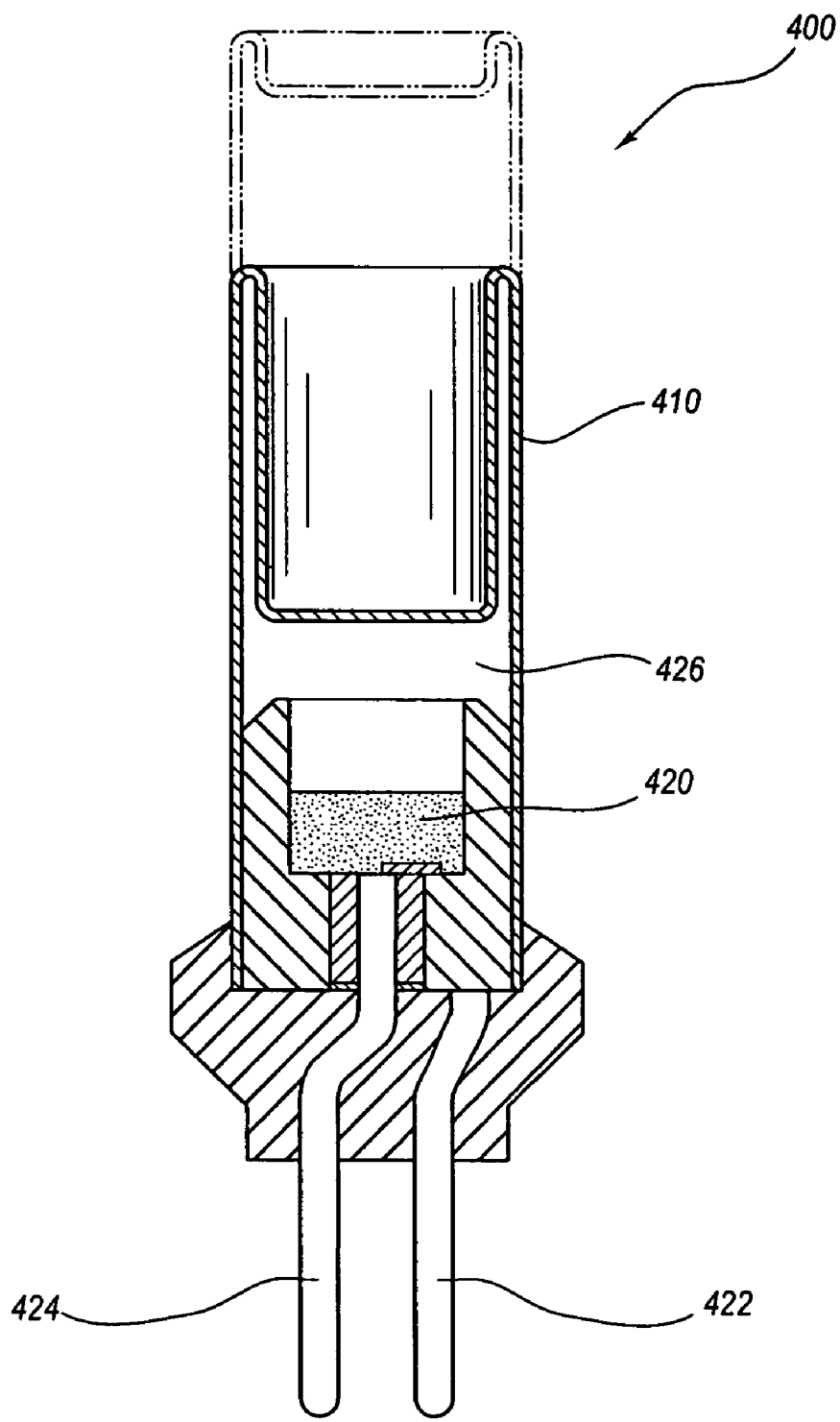
FIG. 5 is a cross-sectional view of a redrawn initiator suitable for use with embodiments of the disclosed invention.
Figure 6A:
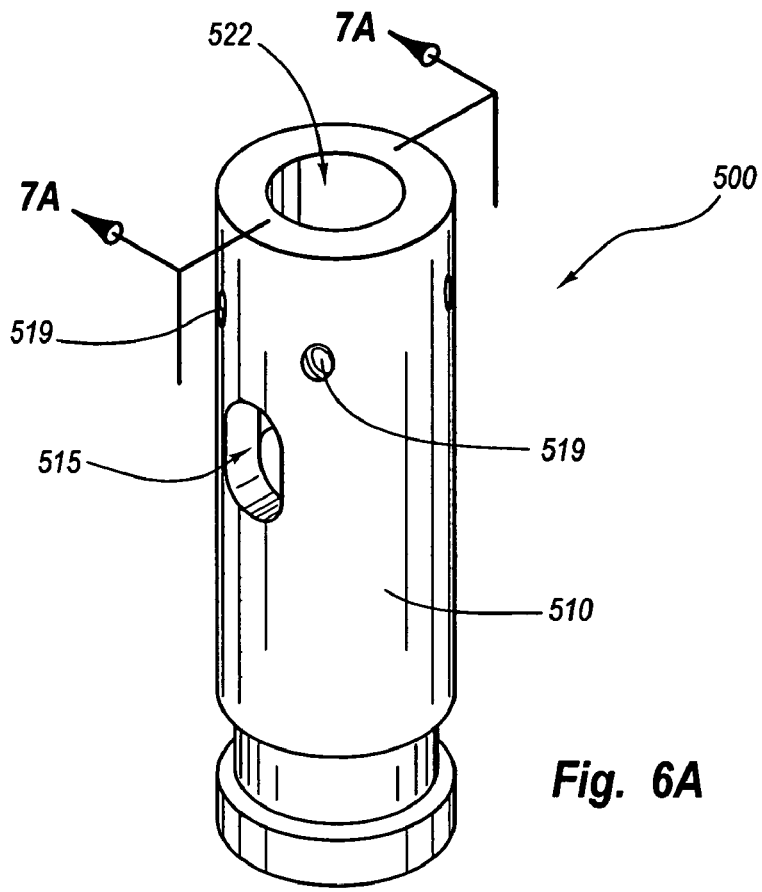
FIG. 6A is a perspective view of another embodiment of an airbag tether release mechanism.
Figure 6B:
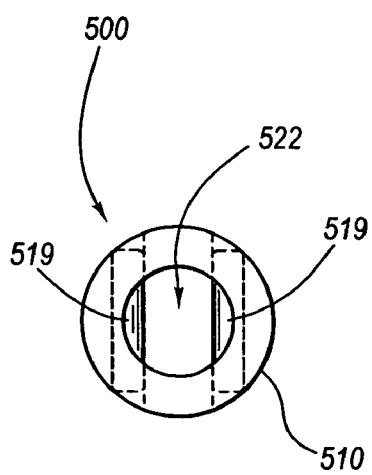
FIG. 6B is a top plan view of the embodiment depicted in FIG. 6A.
Figure 6C:
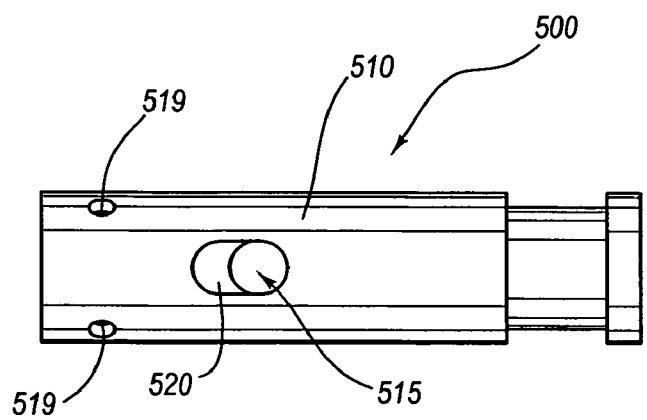
FIG. 6C is a side elevation view of the embodiment depicted in FIG. 6A and FIG. 6B.

One embodiment of a "redrawn" initiator for use in connection with various embodiments of the invention is shown in FIG. 5. Initiator 400 is configured to provide an inherent seal to prevent the external release of pyrotechnic residues upon deployment, as previously described. Initiator 400 includes an extendable initiator cup 410, a charge 420, and two electrical connectors 422 and 424.

Extendable initiator cup 410 is folded in or rolled back inside itself prior to deployment. Upon deployment of the charge 420, the initiator cup 410 is unrolled or unfolded, at least partially, to thereby extend the initiator cup 410 (as shown in phantom in FIG. 5) and provide a force that can be used to actuate a cutter or other such devices. This force can be provided via initiator 400 without any flash, spark, or any other external release of pyrotechnic residues.

Upon deployment, the reactive charge 420 reacts to produce reaction products that can extend the extendable initiator cup 410 from a first length to a second length, wherein the second length is greater than the first length. As will be appreciated by those skilled in the art, the reactive charge 420 can include one or more known reactive charge materials, such as a pyrotechnic, which can be actuated by an electrical current introduced through electrical connectors 422 and 424. Charge 420 may, for example, include a fuel slurry and an oxidizer slurry mixed together. Examples of reactive charges known in the art and useful in the initiator device of the invention include mixtures including zirconium and potassium perchlorate (ZPP).

The extendable initiator cup 410 is desirably sealed around storage chamber 426 such that the reaction products released from charge 420 do not escape from the storage chamber 426 and are therefore available to extend initiator cup 410. This provides initiator 400 with an inherent seal to prevent the external release of pyrotechnic residues upon deployment. The extendable initiator cup 410 may be formed of a lightweight and/or thin material. In one embodiment of the extendable initiator cup, the cup is formed of a metal, such as, for example, stainless steel. As will be appreciated by those skilled in the art, the size, shape, configuration, and materials used in manufacturing of the extendable initiator cup can vary depending on the desired application. Likewise, the amount of reactive charge provided to extend the extendable initiator cup may depend on, for example, the type of reactive charge used, the size of the storage chamber, as well as the stroke, construction, and materials of the extendable initiator cup. Varying these parameters in accordance with desired outcomes and configurations will be apparent to one of ordinary skill in the art upon review of the disclosure provided herein.

Those having skill in the art will also appreciate that, whereas the embodiment depicted in FIG. 5 includes an initiator cup that is folded inside itself, other folds are available and suitable for use in connection with embodiments of the invention. For example, other embodiments may be folded in accordion-style on the sides or may include corrugations. Still other embodiments may include multiple folds, some of which fold the cup inside itself, and others of which fold the cup laterally with respect to the deployment direction, or otherwise. The pressure from the reaction products, resulting from the initiated reactive charge, may extend the extendable initiator cup by causing the corrugations and/or folds to widen, flatten, and/or unfold, at least partially.

Yet another embodiment of the invention is depicted in FIGS. 6A-7B. Tether release mechanism 500 includes an initiator 505 (see FIGS. 7A and 7B) positioned within a housing 510. Initiator 505 is non-flashing and non-propulsive such that it does not emit a flash and has no loose parts that it propels upon deployment. Initiator 505 is also provided with an inherent seal to prevent the external release of pyrotechnic residues upon deployment.

Tether release mechanism 500 also includes a tether restraint structure 515, which in this embodiment comprises an opening 515 formed within housing 510. Tether release mechanism 500 further includes a pin structure 519, which in this embodiment comprises a split spring pin 519. The function of split spring pin 519 will be discussed in greater detail below.

Figures 7A, 7B:
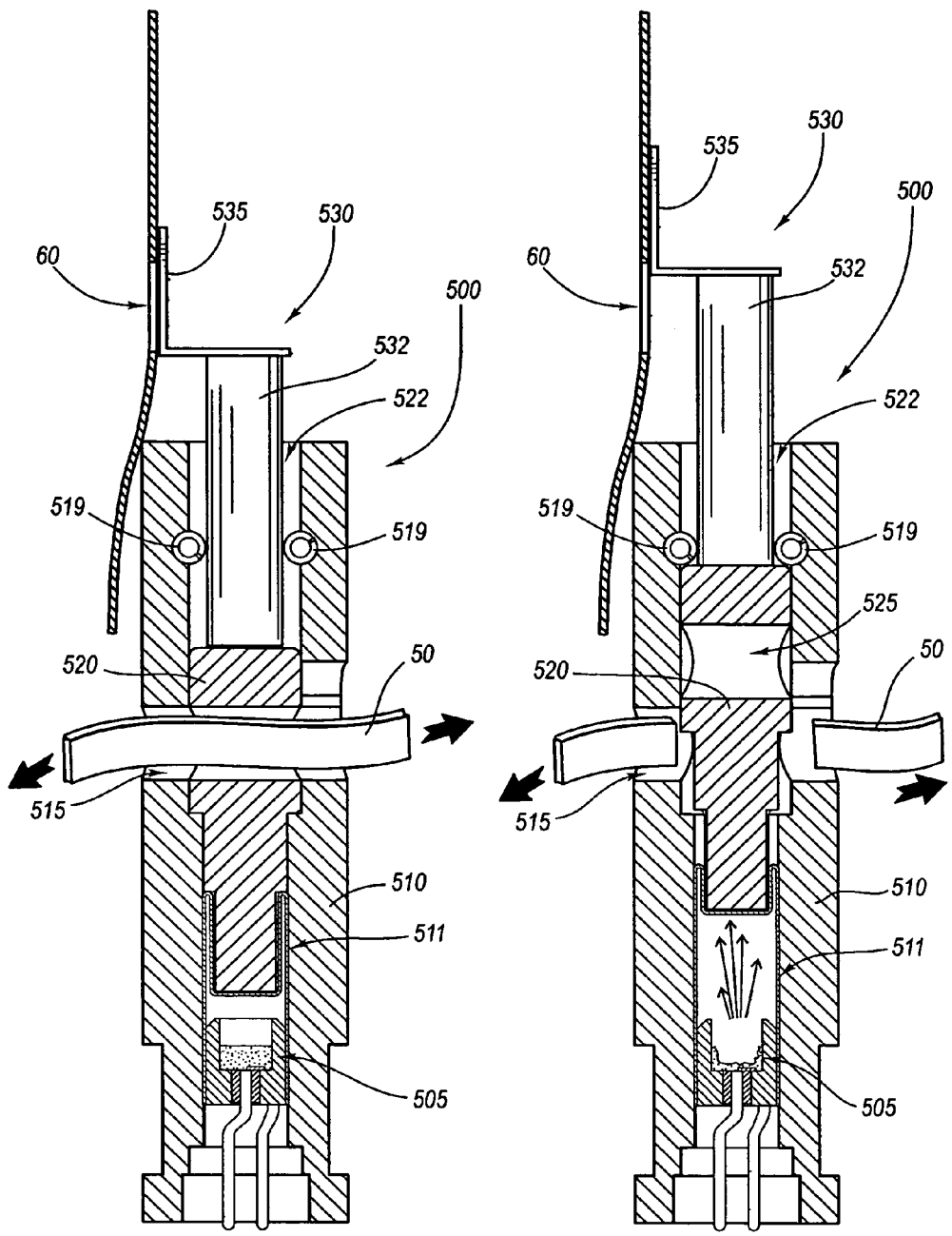
FIG. 7A is a cross-sectional view taken along line 7A-7A in FIG. 6A prior to deployment of the initiator.
FIG. 7B is a cross-sectional view like that of FIG. 7A but taken after deployment of the initiator.

As shown in the cross-sectional views of FIGS. 7A and 7B, tether release mechanism also includes a cutter 520, which comprises a piston having an opening 525 formed therein. Piston 520 is positioned in a cylindrical slot 522 within housing 510 and is configured to be slidable within slot 522. One end of piston 520 is positioned adjacent to the redrawn portion of initiator 505 (extendable initiator cup 511) such that the force of unrolling and extending initiator cup 511 can be transmitted to piston 520.

Like some embodiments previously discussed, piston 520 is configured such that, prior to deployment of the initiator 505, the opening 515 in the housing 510 is aligned with the opening 525 in the piston 520, and wherein, following deployment of the initiator 505, the opening 525 in the piston 520 is moved out of alignment with the opening 515 in the housing 510. A tether 50 may therefore be strung through the aligned openings 515 and 525. Upon deployment of initiator 505, the force on piston 520 causes the misalignment of the two openings. The shearing force from the sliding of piston 520 within slot 522 may be used to sever the tether 50.

Unlike any of the previously disclosed embodiments, tether release mechanism 500 also includes a vent actuator 530. Vent actuator 530 is configured to alter the status of a vent opening in response to the deployment of the initiator 505. In other words, vent actuator 530 is configured to open and/or close a vent opening in response to the deployment of initiator 505.

Vent actuator 530 includes a connecting rod 532. Connecting rod 532 is attached to piston 520 at the distal end (relative to initiator 505) of piston 520. Split spring pin 519 prevents piston 520 from exiting the housing 510. Connecting rod 532, on the other hand, is capable of passing by the split spring pin 519 due to its smaller diameter such that it can, at least partially, exit the housing 510. At the end of connecting rod 532 opposite from the end attached to piston 520 a vent door 535 is connected with the connecting rod 532. Vent door 535 can be used to selectively block and/or unblock a vent opening in an inflator housing, an airbag cushion, or elsewhere.

For example, as illustrated in FIG. 7A, vent door 535 blocks vent opening 60 prior to deployment of initiator 505. Following deployment of the initiator 505, tether 50 is cut and vent door 535 is simultaneously moved away from vent opening 60, as shown in FIG. 7B, thereby allowing inflation gas to enter or exit vent opening 60, depending on the location of the vent opening 60 and other characteristics of the corresponding airbag module. Of course, other embodiments are contemplated in which a vent door or other structure operatively connected with an initiator closes a vent opening in response to deployment of the initiator.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims. Note also that elements recited in means-plus-function format are intended to be construed in accordance with 35 U.S.C. § 112 ¶6.

The invention claimed is:

1. An airbag tether release mechanism, comprising:
    a housing;
    an initiator positioned within the housing, wherein the initiator comprises an output cup having a redrawn end that unrolls and expands during deployment, and wherein the initiator is configured such that it provides an inherent seal to prevent the external release of pyrotechnic residues upon deployment;
    a cutter operatively connected with the initiator such that deployment of the initiator actuates the cutter; and
    a tether restraint structure configured to secure a tether until the tether is released by actuation of the cutter.

2. The airbag tether release mechanism of claim 1, wherein the tether restraint structure comprises an opening formed within the housing.

3. The airbag tether release mechanism of claim 2, wherein the cutter comprises a piston having an opening formed therein.

4. The airbag tether release mechanism of claim 3, wherein the cutter is configured such that, prior to deployment of the initiator, the opening in the housing is at least partially aligned with the opening in the piston, and wherein, following deployment of the initiator, the opening in the piston is moved out of alignment with the opening in the housing.

5. The airbag tether release mechanism of claim 1, wherein the cutter comprises a cutting blade.

6. The airbag tether release mechanism of claim 1, wherein the tether restraint structure comprises a clip.

7. The airbag tether release mechanism of claim 6, wherein the clip is configured to snap into a recess formed within the housing.

8. The airbag tether release mechanism of claim 6, wherein the cutter is configured to sever at least a portion of the clip upon deployment of the initiator.

9. A method for releasing an airbag tether, comprising:
    restraining a tether, wherein the tether is connected to an airbag cushion;
    deploying an initiator, wherein the initiator is deployed without externally releasing pyrotechnic residues;
    actuating a cutter, wherein the deployment of the initiator actuates the cutter; and
    cutting the tether, wherein the actuation of the cutter causes the cutting of the tether.

10. The method of claim 9, wherein the initiator comprises an output cup having a redrawn end that unrolls and expands during deployment.

11. The method of claim 9, wherein the cutter comprises a piston having an opening formed therein.

12. The method of claim 11, wherein, prior to the actuation step, the tether extends through the opening in the piston.

13. The method of claim 12, wherein the actuation of the piston causes the opening in the piston to be at least partially misaligned with another opening.

14. The method of claim 9, wherein the cutter comprises a cutting blade.

15. The method of claim 9, further comprising altering the status of a vent opening in response to the deployment of the initiator.

16. The method of claim 15, wherein altering the status of the vent opening comprises opening the vent opening.

17. The method of claim 15, wherein altering the status of the vent opening comprises closing the vent opening.

18. The method of claim 15, wherein a connecting rod is connected with the cutter, and wherein the connecting rod is used to alter the status of the vent opening.

19. The method of claim 18, wherein a vent door is connected with the connecting rod.

20. An airbag tether release mechanism, comprising:
a housing;
restraining means for restraining an airbag tether;
an initiator positioned within the housing, wherein the initiator comprises an output cup having a redrawn end that unrolls and expands during deployment, and wherein the initiator is configured such that it provides an inherent seal to prevent the external release of pyrotechnic residues upon deployment; and
releasing means for releasing the tether from the restraining means, wherein the releasing means is actuated by the initiator.

21. The airbag tether release mechanism of claim 20, wherein the releasing means comprises a cutter.

22. The airbag tether release mechanism of claim 21, wherein the cutter comprises a cutting blade.

23. The airbag tether release mechanism of claim 21, wherein the cutter is configured to cut through the tether upon deployment of the initiator.

24. The airbag tether release mechanism of claim 21, wherein the cutter is configured to cut through the restraining means upon deployment of the initiator.

25. The airbag tether release mechanism of claim 20, wherein the restraining means comprises an opening in the housing.

26. The airbag tether release mechanism of claim 20, wherein the restraining means comprises a clip.

27. The airbag tether release mechanism of claim 26, wherein the clip is configured to snap into a recess formed within the housing.

28. An airbag tether release mechanism, comprising:
a housing;
an initiator positioned within the housing, wherein the initiator is configured such that it provides an inherent seal to prevent the external release of pyrotechnic residues upon deployment;
a piston comprising a cutter, wherein the piston is operatively connected with the initiator such that deployment of the initiator actuates the piston;
a tether restraint structure configured to secure a tether until the tether is released by actuation of the piston; and
a vent actuator configured to alter the status of a vent opening in response to the deployment of the initiator.

29. The airbag tether release mechanism of claim 28, wherein the vent actuator comprises a connecting rod connected with the piston.

30. The airbag tether release mechanism of claim 29, wherein the vent actuator further comprises a vent door connected with the connecting rod.

31. The airbag tether release mechanism of claim 29, further comprising a pin structure, wherein the pin structure is used to prevent the piston from exiting the housing, and wherein the connecting rod passes by the pin structure and exits the housing.

32. The airbag tether release mechanism of claim 31, wherein the pin structure comprises a split spring pin.

33. The airbag tether release mechanism of claim 28, wherein the vent actuator is configured to alter the status of the vent opening by opening the vent opening.

34. The airbag tether release mechanism of claim 28, wherein the vent actuator is configured to alter the status of the vent opening by closing the vent opening.

35. The airbag tether release mechanism of claim 28, wherein the initiator comprises an output cup having a redrawn end that unrolls and expands during deployment.

* * * * *